US010810755B2

(12) United States Patent
Tramontin, II

(10) Patent No.: US 10,810,755 B2
(45) Date of Patent: Oct. 20, 2020

(54) SYSTEM AND METHOD OF DETERMINING SIZE OF A THREADED FASTENER

(71) Applicant: Joseph Angelo Tramontin, II, Napoleon, OH (US)

(72) Inventor: Joseph Angelo Tramontin, II, Napoleon, OH (US)

(\*) Notice: Subject to any disclaimer, the term of this patent is extended or adjusted under 35 U.S.C. 154(b) by 65 days.

(21) Appl. No.: 16/286,042

(22) Filed: Feb. 26, 2019

(65) Prior Publication Data
US 2019/0266740 A1    Aug. 29, 2019

Related U.S. Application Data

(60) Provisional application No. 62/635,960, filed on Feb. 27, 2018.

(51) Int. Cl.
*G06K 9/52* (2006.01)
*G06T 7/60* (2017.01)
*G01B 11/08* (2006.01)
*G01B 11/02* (2006.01)

(52) U.S. Cl.
CPC ............. *G06T 7/60* (2013.01); *G01B 11/08* (2013.01); *G06K 9/52* (2013.01); *G01B 11/02* (2013.01)

(58) Field of Classification Search
CPC ............ G06K 9/00664; G06K 9/2027; G06K 9/3233; G06K 9/342; G06K 9/4604; G06K 9/6201; G06T 2207/10024; G06T 7/11; G06T 7/194; G06T 7/42; G06T 7/45; G06T 7/90; G06T 11/60; G06T 1/20; G06T 2207/20016; G06T 3/40; G06T 3/4023; G01S 15/8922; G01S 17/10; G01S 17/36; G01S 7/486; G01S 7/52004

See application file for complete search history.

(56) References Cited

U.S. PATENT DOCUMENTS

| | | | | |
|---|---|---|---|---|
| 2010/0251556 A1* | 10/2010 | Burr | .................. | G01B 3/36 33/199 R |
| 2011/0054655 A1* | 3/2011 | Krantz | .................. | G06Q 50/04 700/98 |
| 2016/0038418 A1* | 2/2016 | DeSimone | ........... | A61K 31/713 424/1.11 |

\* cited by examiner

*Primary Examiner* — Quan M Hua
(74) *Attorney, Agent, or Firm* — Dunlap Bennett & Ludwig, PLLC

(57) ABSTRACT

A system and method for determining a size of a threaded fastener includes a database and a computer. The database stores data including dimensions of at least one standard object. The computer includes a processor, a memory, a user interface, and a camera. An image of a threaded fastener and a standard object is captured by the camera. The processor then performs a calculation of the thread size and the diameter of the threaded fastener by comparing the dimensions from the database with the standard object and the threaded fastener in the image and presents the thread size and the diameter of the threaded fastener to a user.

12 Claims, 2 Drawing Sheets

SYSTEM AND METHOD OF DETERMINING SIZE OF A THREADED FASTENER

CROSS-REFERENCE TO RELATED APPLICATION

This application claims the benefit of priority of U.S. provisional application No. 62/635,960, filed Feb. 27, 2018, the contents of which are herein incorporated by reference.

BACKGROUND OF THE INVENTION

The present invention relates to sizes of a screw or bolt and, more particularly, to a system and method for quickly and easily determining a thread size and a diameter of a screw or bolt.

Screw size is measured in thread size and diameter. Thread size of a screw or bolt is calculated by determining the number of threads present within a distance. For example, a ¼-20 screw has 20 threads per inch and a diameter of ¼ inch. To determine the thread size, one must either measure the screw or alternatively, perform a trial and error method of using a board with different sized openings and markings to receive the screw and provide a user with the screw size. The above-mentioned methods are time consuming and tedious.

As can be seen, there is a need for a system and method for quickly and easily determining a thread size and a diameter of a screw or bolt.

SUMMARY OF THE INVENTION

In one aspect of the present invention, a system for determining a size of a threaded fastener comprises: a database storing data comprising dimensions of at least one standard object; a computer comprising a processor, a memory, a user interface, and a camera, wherein when an image of a threaded fastener and the at least one standard object is captured by the camera, the processor accesses the dimensions of the at least one standard object from the database; calculates the thread size and the diameter of the threaded fastener by comparing the dimensions of the at least one standard object from the database with the standard object and the threaded fastener in the image; and presents the thread size and the diameter of the threaded fastener.

In another aspect of the present invention, a method of determining a size of a threaded fastener comprises: capturing, via a camera, an image of the threaded fastener and a standard object; accessing, via the software running on the computer, dimensions of the at least one standard object from the database; calculating, via the software running on the computer, the thread size and the diameter of the threaded fastener by comparing the dimensions of the at least one standard object with the standard object and the threaded fastener in the image; and presenting, via software running on the computer, the thread size and the diameter of the threaded fastener.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
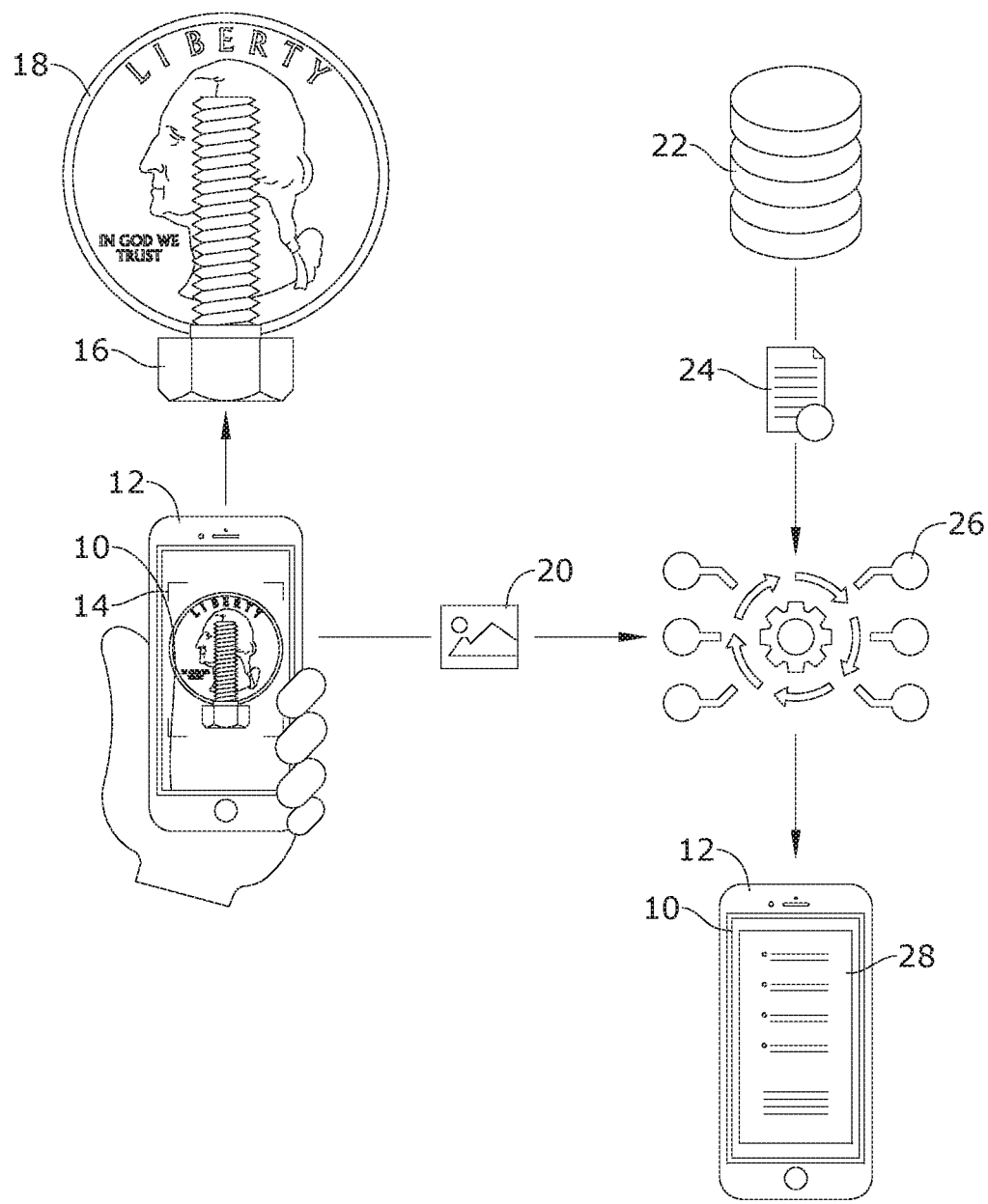
FIG. 1 is a schematic view of an embodiment of the present invention.
Figure 2:
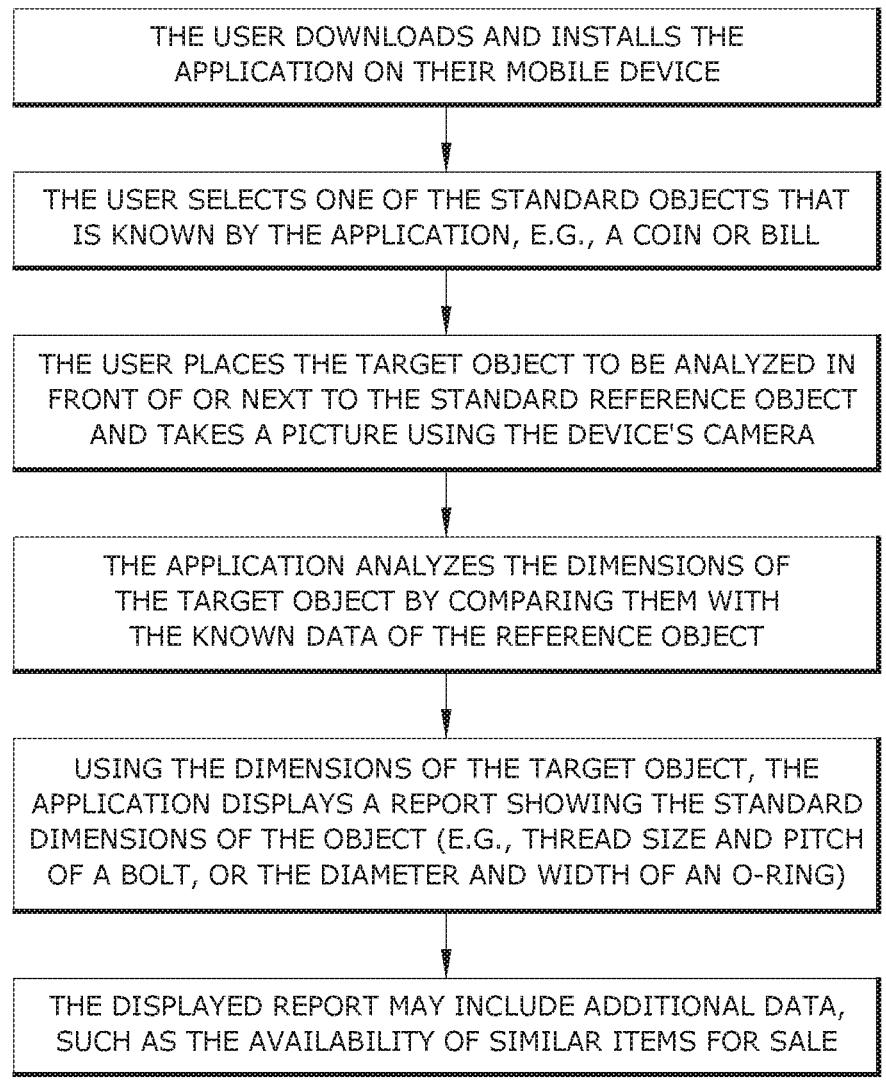
FIG. 2 is a flow chart of an embodiment of the present invention.

Referring to FIGS. 1 and 2, the present invention includes a system and method for determining a size of a threaded fastener 16. The present invention includes a database 22 and a computer 12. The database 22 stores data 24 including dimensions of at least one standard object 18. The computer 12 includes a processor, a memory, a user interface, and a camera 14. When an image 20 of a threaded fastener 16 and a standard object 18 is captured by the camera 14, the processor performs a calculation 26 of the thread size and diameter 28 of the threaded fastener 16 by comparing the dimensions of the database with the standard object 18 and the threaded fastener 16 in the image. The processor then presents the thread size and diameter 28 of the threaded fastener 16 to a user.

In certain embodiments, the database 22 stores data 24 including dimensions of a plurality of standard objects 18. In such embodiments, the user may review the plurality of standard objects on the computer 12 and select one of the standard objects that the user is going to take an image of. The processor than then performs the calculation 26 of the thread size and diameter 28 of the threaded fastener 16 by comparing the dimensions of the selected standard object 18 of the database 22 with the standard object 18 and the threaded fastener 16 in the image. Alternatively, the processor may determine the standard object 18 of the image 20 by matching the image with other images already saved on the database and automatically pull the standard object dimensions from the database 22.

The standard objects 18 may include mass produced objects that do not vary in size and are easily accessible. An example of a standard object 18 may be a coin or paper money. The threaded fastener may include a screw, a bolt, a threaded rod, or any threaded fastener.

For the processor to compare the dimensions of the standard object 18 with the threaded fastener 16, the threaded fastener should be within a specified distance from the standard object 18. For example, the threaded fastener 16 may be placed on top of the standard object 18 or laid side by side with the standard object 18 for the image. The processor counts the number of threads that are present within a distance of the threaded fastener 16. The distance is calculated using the standard object 18 within the image. The processor determines the number of threads per-inch or per-centimeter much like in the way the camera of a smart phone can scan a barcode.

The computer 12 of the present invention may be a laptop, desktop, or a smart device, such as a tablet or phone. The computer 12 is at least the processor and the memory. The computer 12 may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computer 12 includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on.

The memory and the database 22 may include an HDD, a floppy disk drive, flash memory, an optical disc, a magneto-optical disc, magnetic tape, a Universal Serial Bus (USB) drive, a solid-state drive (SSD), or a combination of two or more of these. The memory and the database 22 may include removable or non-removable (or fixed) media, where appropriate. The memory and the database 22 may be internal or external to computer 12, where appropriate. In particular embodiments, the memory may be volatile, non-volatile memory, or a combination thereof and the database 22 may include non-volatile, solid-state memory or a combination of volatile and non-volatile memory.

The user interface includes hardware, software, or both providing one or more interfaces for user communication with the computer 12. As an example and not by way of limitation, the user interface may include a keyboard, keypad, microphone, monitor, mouse, printer, scanner, speaker, still camera, stylus, tablet, touchscreen, trackball, video camera, another user interface or a combination of two or more of these. For example, when the computer 12 is a smart device, the user interface is a touch screen interface. In such embodiments, the selection process of the standard object 18 and the thread size and diameter 28 of the threaded fastener 16 are presented on the touch screen interface.

The communication interface includes hardware, software, or both providing one or more interfaces for communication (e.g., packet-based communication) between the computer 12 and one or more other computers 12 or one or more networks. As an example, and not by way of limitation, communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computer 12 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer 12 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computer 12 may include any suitable communication interface for any of these networks, where appropriate.

A method of using the present invention may include the following. A software 14 may be downloaded using the Internet and installed on the computer, such as an application loaded on a smart device. The camera 14 is used to capture the image 20 of the threaded fastener 16 and the standard object 18. The computer receives a selection of the dimensions of the standard object to be used for the calculation 26, calculates the thread size and diameter 28 of the threaded fastener 16 by comparing the dimensions of the standard object 18 with the standard object 18 and the threaded fastener 16 in the image, and presents the thread size and diameter 28 of the threaded fastener 18 to the user.

It should be understood, of course, that the foregoing relates to exemplary embodiments of the invention and that modifications may be made without departing from the spirit and scope of the invention as set forth in the following claims.

What is claimed is:

1. A system for determining a size of a threaded fastener comprising:
   a database storing data comprising dimensions of at least one standard object;
   a computer comprising a processor, a memory, a user interface, and a camera, wherein when an image of a threaded fastener and the at least one standard object is captured by the camera, the processor
     accesses the dimensions of the at least one standard object from the database;
     calculates a thread size and a diameter of the threaded fastener by comparing the dimensions of the at least one standard object from the database with the standard object and the threaded fastener in the image; and
     presents the thread size and the diameter of the threaded fastener.

2. The system of claim 1, wherein the database stores data comprising dimensions of a plurality of standard objects, wherein the processor
   presents the plurality of standard objects to a user; and
   receives a selection of one of the plurality of standard objects from the user.

3. The system of claim 1, wherein the image includes the threaded fastener laying on top of the standard object or laying side by side with the standard object.

4. The system of claim 1, wherein the computer is a smart device and the user interface is a touch screen interface.

5. The system of claim 4, wherein the thread size and the diameter of the threaded fastener is presented on the touch screen interface.

6. The system of claim 1, wherein the threaded fastener is a screw, a bolt, or a threaded rod.

7. A method of determining a size of a threaded fastener comprising:
   capturing, via a camera, an image of the threaded fastener and a standard object;
   accessing, via the software running on the computer, dimensions of the at least one standard object from the database;
   calculating, via the software running on the computer, a thread size and a diameter of the threaded fastener by comparing the dimensions of the at least one standard object from the database with the standard object and the threaded fastener in the image; and
   presenting, via software running on the computer, the thread size and the diameter of the threaded fastener.

8. The method of claim 7, wherein the database stores data comprising dimensions of a plurality of standard objects, wherein the method further comprises
   presenting, via the software running on the computer, the plurality of standard objects to a user; and
   receiving, via the software running on the computer, a selection of one of the plurality of standard objects from the user.

9. The method of claim 7, wherein the image includes the threaded fastener laying on top of the object or laying side by side with the object.

10. The method of claim 7, wherein the computer is a smart device comprising a touch screen interface.

11. The method of claim 10, wherein the thread size and the diameter of the threaded fastener is presented on the touch screen interface.

12. The method of claim 7, wherein the threaded fastener is a screw, a bolt, or a threaded rod.

* * * * *